United States Patent
Grabau et al.

(10) Patent No.: US 7,364,407 B2
(45) Date of Patent: Apr. 29, 2008

(54) TRANSITION ZONE IN WIND TURBINE BLADE

(75) Inventors: Peter Grabau, Kolding (DK); Lars Fuglsang Andersen, Odense S (DK)

(73) Assignee: LM Glasfiber A/S, Lunderskov (DK)

( * ) Notice: Subject to any disclaimer, the term of this patent is extended or adjusted under 35 U.S.C. 154(b) by 0 days.

(21) Appl. No.: 10/508,385

(22) PCT Filed: Mar. 19, 2003

(86) PCT No.: PCT/DK03/00184

§ 371 (c)(1),
(2), (4) Date: Sep. 20, 2004

(87) PCT Pub. No.: WO03/078832

PCT Pub. Date: Sep. 25, 2003

(65) Prior Publication Data

US 2005/0180854 A1  Aug. 18, 2005

(30) Foreign Application Priority Data

Mar. 19, 2002 (DK) ............................ 2002 00425

(51) Int. Cl.
*F03D 1/06* (2006.01)
*F03D 3/06* (2006.01)
*B29C 70/06* (2006.01)

(52) U.S. Cl. .................. 416/229 R; 416/230
(58) Field of Classification Search ............ 416/230, 416/229 R, 241 R
See application file for complete search history.

(56) References Cited

U.S. PATENT DOCUMENTS

| | | | |
|---|---|---|---|
| 3,713,753 A * | 1/1973 | Brunsch | 416/226 |
| 4,000,956 A * | 1/1977 | Carlson et al. | 416/230 |
| 4,077,740 A | 3/1978 | Sobey | 416/230 |
| 4,533,297 A | 8/1985 | Bassett | |
| 4,976,587 A * | 12/1990 | Johnston et al. | 416/230 |
| 5,108,262 A * | 4/1992 | Crane | 416/230 |
| 5,140,856 A | 8/1992 | Larsen | |
| 5,520,532 A | 5/1996 | Reinfelder et al. | |
| 6,056,838 A | 5/2000 | Besse et al. | |
| 6,287,122 B1 | 9/2001 | Seeram et al. | |
| 2005/0053466 A1* | 3/2005 | Finn et al. | 416/230 |
| 2006/0083907 A1* | 4/2006 | Bech et al. | 428/212 |
| 2007/0189903 A1* | 8/2007 | Eyb | 416/230 |

FOREIGN PATENT DOCUMENTS

| | | |
|---|---|---|
| DE | 202 06 942 U1 | 12/2002 |
| GB | 2012698 | 8/1979 |
| GB | 2 164 309 A | 3/1986 |
| WO | WO 00/14405 | 3/2000 |
| WO | WO 03/068494 A1 | 8/2003 |

* cited by examiner

Primary Examiner—Edward K. Look
Assistant Examiner—Nathan Wiehe
(74) Attorney, Agent, or Firm—Cooper & Dunham LLP

(57) ABSTRACT

The invention relates to a wind turbine blade and a transitional shell blank for the manufacture of the shell of a wind turbine blade, the blade or the transitional shell blank being made of fibre-reinforced polymer including a first type of fibres (1, 3, 6) of a first stiffness and a first elongation at breakage, and a second type of fibres (2, 5, 7) of a different stiffness and a different elongation at breakage. According to the invention the two types of fibres are distributed in the polymer matrix. When seen in a sectional view perpendicular to longitudinal direction of the blade or the transitional shell blank, the quantitative ratio of the two types of fibres varies continuously in the longitudinal direction of the blade or of the transition shell blank.

29 Claims, 2 Drawing Sheets

TRANSITION ZONE IN WIND TURBINE BLADE

The invention relates to a wind turbine blade and to a prefabricated transitional laminate for the manufacture of the shell of a wind turbine blade.

Wind turbine blades are typically made by means of two blade shell halves of fibre-reinforced polymer. When moulded the two halves are glued together along the edges and via two bracings, which prior thereto have been glued to the inner face of one the blade shell halves. The other blade shell half is then arranged on top of bracings and glued thereto and along the edges.

The blade shell halves per se are typically made by vacuum infusion, in which evenly distributed fibres, rovings, which are fibre bundles, bands of rovings or mats, which may be felt mats of single-fibres or woven mats of fibre rovings, are layered in a mould part and cover by a vacuum bag. By creating vacuum (typically 80-90%) in the cavity between the inner face of the mould part and the vacuum bag resin is sucked into and fills the cavity containing the fibre material. In order to obtain the optimum distribution of resin, so-called distribution layers and distribution channels are often used between the vacuum bag and the fibre material.

The used polymer is typically polyester or epoxy, and the fibre reinforcement is usually based on fibre glass. It is, however, also known to use carbon fibres which are stiffer than glass fibres, but have a smaller elongation at breakage than glass fibres. The carbon fibres may be added to obtain a higher degree of stiffness and/or a lower weight. It is thus possible to let a portion of the fibre reinforcement be formed of carbon fibres to reduce the weight of the blade without the blade loosing too much of its stiffness. Carbon fibres are, however, encumbered by the drawback of being significantly more expensive than glass fibres, which is one of the reasons why wind turbine blades of carbon fibre-reinforced polymer are not widely used. Other types of reinforcement fibres, eg aramid fibres (Kevlar®) and other types of plastic fibres, natural fibres, eg hemp fibres and flax fibres may also be used for the manufacture of wind turbine blades.

BACKGROUND ART

From WO 98/53200 and WO 00/79128 it is known to provide a wind turbine blade shell of glass-fibre-reinforced polymer with a carbon fibre layer, whose electrically conducting properties may be utilised for heating of the blade for de-icing thereof. The carbon fibre layer may be embedded in the fibre glass laminate.

From WO 00/14405 it is known to reinforce a wind turbine blade of fibre glass polymer with longitudinal strips of carbon fibre-reinforced polymer. The same publication discloses so-called hybrid composite materials, in which a mixture of glass fibres and carbon fibres has been used as fibre reinforcement.

U.S. Pat. No. 6,287,122 discloses the manufacture of elongated composite products, wherein a variation in the stiffness of the product along its length is obtained by altering the fibre content or the angle orientation of braided fibres.

U.S. Pat. No. 5,520,532 discloses a mould part of fibre-reinforced polymer of a varying stiffness, said stiffness being obtained by varying the number of fibre mat layers.

U.S. Pat. No. 4,077,740 discloses a helicopter rotor blade of a fibre composite material, the stiffness of the blade varying when seen in longitudinal direction. This feature is obtained by varying the fibre orientation so as to obtain an enhanced vibration dampening.

The stiffness of a wind turbine blade of course depends on the shell thickness, the cross-sectional geometry and the material. The cross-sectional dimensions of the wind turbine blade and the shell thickness vary in the longitudinal direction of the blade. Naturally, the largest cross-sectional dimensions are found at the blade root, where the blade cross-section often is substantially circular. Further along the blade, it adopts a more flat shape, which substantially corresponds to an ellipse.

As mentioned above, it is known to combine fibre types in the laminate to obtain the desired properties or compromises between the properties of the different fibre types as regards weight, stiffness and elongation at breakage. The construction of a blade having varying material properties in the longitudinal direction of the blade may, however, also be desirable. Carbon fibres are advantageous due to their stiffness and low density, but are on the other hand expensive compared to glass fibres. Consequently, it may be desirable to use carbon fibre reinforcement, where the use thereof is more advantageous. It may thus be advantageous to reinforce the outermost portion of the blade by carbon fibres and the innermost portion of the blade by glass fibres so as to reduce the weight in the outermost portion and thereby minimising the dead load moment. Less material and/or a smaller cross section is thus required at the innermost portion of the blade and the load on the turbine hub is reduced. The outermost portion of the blade may furthermore be provided with an increased stiffness, whereby the risk of the blade deflecting so heavily that the blade tip hits the turbine tower is reduced. Problems with high dead load and insufficient stiffness have increased in recent years, as the length of wind turbine blades has increased continuously. This tendency seems to continue in the future.

In order to reduce the size of mounting flanges and the like, a demand may arise for small cross-sectional dimensions at the blade root. The total weight of the blade may be considerably reduced by using carbon fibres as reinforcement material for the innermost portion of the blade, ie for the blade root.

Other types of fibres, eg cellulosed-based fibres such as hemp fibres or flax fibres are potential materials for the reinforcement of wind turbine blades.

Other reasons may also exist for providing different positions on wind turbine blades with different types of reinforcement fibres. If two zones of a wind turbine blade, which are juxtaposed in the longitudinal direction, are reinforced with fibre types differing from each other and having differing stiffness and elongation at breakage, the blade is provided with an abrupt change in the stiffness. At heavy dynamic or static loads, most of the stress is received in the outermost portions of the stiffest fibres resulting in a high risk of these fibres and thus the blade being destroyed. Put differently, a deflection of the blade causes a heavy stress concentration at the boundary surface between the two zones in the zone having the stiffest fibres. The problem is particularly severe at dynamic loads to which the wind turbine blades are subjected.

DESCRIPTION OF THE INVENTION

The object of the invention is to provide a wind turbine blade of fibre-reinforced polymer including a first type of fibres of a first stiffness and a first elongation at breakage, and a second type of fibres of a different stiffness and a different elongation at breakage, in which areas of the blade may be optimised as regards strength, dead load and stiffness without being encumbered by adverse effects such as an abrupt change in the stiffness.

According to the invention the object is obtained in that the two types of fibres are thus distributed in the polymer matrix that the quantitative ratio of the two types of fibres varies continuously in the longitudinal direction of the blade. In this context the expression "continuously" should be understood in a wide sense and thus also as covering "gradually" and "evenly".

As a result a smooth transition between two areas of a wind turbine blade, said areas having two different degrees of stiffness due to the different quantitative ratio one fibre type to the other.

According to an embodiment of the invention the first fibre type may be glass fibres and the second type may be carbon fibres, whereby the wind turbine blade is shaped such that the amount of carbon fibres increases towards the tip of the blade. The weight is thus reduced in the outermost part, whereby the dead load moment is minimised. Less material and/or a smaller cross section is thus required at the innermost portion of the blade and the load on the turbine hub is reduced.

At a certain degree of stiffness, the dead load may be reduced by using carbon fibres in the outer end portion, whereby the dynamic loads on the blade shell and the blade root may also be reduced, said parts being particularly sensitive to dynamic loads. At a certain degree of stiffness, the dead load may be reduced by using carbon fibres in the outer end portion, whereby the dynamic loads on the blade shell and the blade root may also be reduced, said parts being particularly sensitive to dynamic loads.

By changing the carbon fibre content in the outer end portion or the length thereof, the stiffness as well as the natural frequencies may be varied. The stiffness and the natural frequencies may thus be optimised to the specific conditions.

A comparatively stiff outer end portion and a comparatively less stiff inner end portion result in an advantageous deflection shape as regards aerodynamic damping, the damping depending on the integrated deflection along the blade during a vibration. An increased aerodynamic damping is advantageous in that the aerodynamic load thus is reduced.

Compared to a blade made solely of glass-fibre-reinforced polymer or a blade made solely of carbon-fibre-reinforced polymer, a blade according to the invention renders an optimum stiffness to costs ratio.

The end of the wind turbine blade including the blade root may also be provided with a comparatively large amount of carbon fibres having a higher stiffness than glass fibres, whereby the cross-sectional dimensions of the blade root and consequently also the size of mounting flanges and the like can be reduced.

According to an embodiment the quantitative ratio may increase or decrease continuously from a first level to a second level.

According to a preferred embodiment the quantitative ratio varies only in a transition zone of a length shorter than the length of the blade. The quantitative ratio may thus be varied in a limited area only, which may be advantageous for reasons of production.

According to a preferred embodiment the transition zone is provided between a first and a second zone of a substantially uniform quantitative ratio. This transition zone may for instance have a length ranging between 0.5 and 1 metre. A length of up to 10 metres or even thereabove may, however, also be preferred. The first zone, which may include the blade root, may also contain a majority of glass fibres and the second zone, which may include the blade tip, may contain a majority of carbon fibres, whereby the transition zone is provided at a position in the centre of the blade.

According to an optional embodiment the blade may be divided into the transition zone including the blade root and an additional zone including the rest of the blade. The carbon fibre amount may thus increase steadily from the blade root to the position at which the additional zone begins, whereby the carbon fibre content remains substantially constant.

According to an optional embodiment the blade may be divided into the transition zone including the blade tip and an additional zone including the rest of the blade.

The length of the zone including the blade tip may constitute 5%, 10%, 15%, 20%, 25%, 30%, 35%, 40%, 45%, 50%, 55%, 60%, 65%, 70%, 75%, 80%, 85% or even 90% of the blade's entire length.

According to an embodiment fibres or fibre bundles of the first type of different lengths may extend from a first end of the transition zone and fibre or fibre bundles of the other type may extend from the opposite end of the transition zone, whereby a particularly smooth transition in stiffness may be obtained.

According to another embodiment the transition zone may be formed of a laminate of several fibre layers, in which each fibre layer has a boundary surface at a position in the longitudinal direction, the fibre layer including carbon fibres on one side of the boundary surface and glass fibres on the other side of the boundary face, the boundary surfaces of each fibre layer being displaced in relation to each other in the longitudinal direction of the blade. As a result a gradual variation in the stiffness is obtained in the transition zone in a particularly simple manner.

According to an optional embodiment the boundary surfaces may be serrated in a sectional view parallel to the fibre layers. An even smoother transition in the stiffness is thus obtained in the transition zone.

According to an embodiment the tips of the serrated boundary surfaces may be displaced in relation to each other in the transverse direction of the blade. As a result an additional smooth variation in the stiffness is obtained in the transition zone.

According to the invention the two types of fibres may be distributed in strengthening bands extending in the longitudinal direction of the blade, the remaining portions of the blade's cross section having a constant content of fibres of the first type and/or of the second type. The load-bearing parts of the blade are often made of such strengthening bands and the invention is naturally particularly suitable for such parts.

The invention also relates to a prefabricated transitional shell blank for the manufacture of the shell of a wind turbine blade, said transitional shell blank being made of fibre-reinforced polymer including a first type of fibres of a first stiffness and a first elongation at breakage and a second type of fibres of a different stiffness and a different elongation at breakage, and wherein when seen in a sectional view perpendicular to the longitudinal direction of the blade the quantitative ratio of the two types of fibres varies in the longitudinal direction of the blade, the two types of fibres being distributed in the polymer matrix and the quantitative ratio varying continuously in the longitudinal direction of the transitional shell blank. Such a prefabricated transitional shell blank makes the production of the wind turbine blades faster and simpler, as the transitional shell blank does not have to be made during the production of the wind turbine blade per se.

The prefabricated transitional shell blank may be formed as a band for reinforcement of the areas of the blade shell forming the pressure and suction sides of the blade and being furthest spaced apart from the centre of the cross section.

If an existing wind turbine is to be provided with longer blades, this may be obtained by replacing the outermost portion of the blade by a transition zone including one or more transitional shell blanks and a carbon fibre tip. The weight of the blade is not or only slightly increased compared to the original blades made completely from glass-fibre-reinforced polymer. Optionally completely new blades may be made for an existing wind turbine or the outermost portion blades may be cut off and replaced by a carbon fibre tip with or without a transition zone.

BRIEF DESCRIPTION OF THE DRAWINGS

The invention is explained in greater detail below by means of various embodiments of the invention in diagrammatical views in the drawings, in which.

BEST MODES FOR CARRYING OUT THE INVENTION

Figure 1:
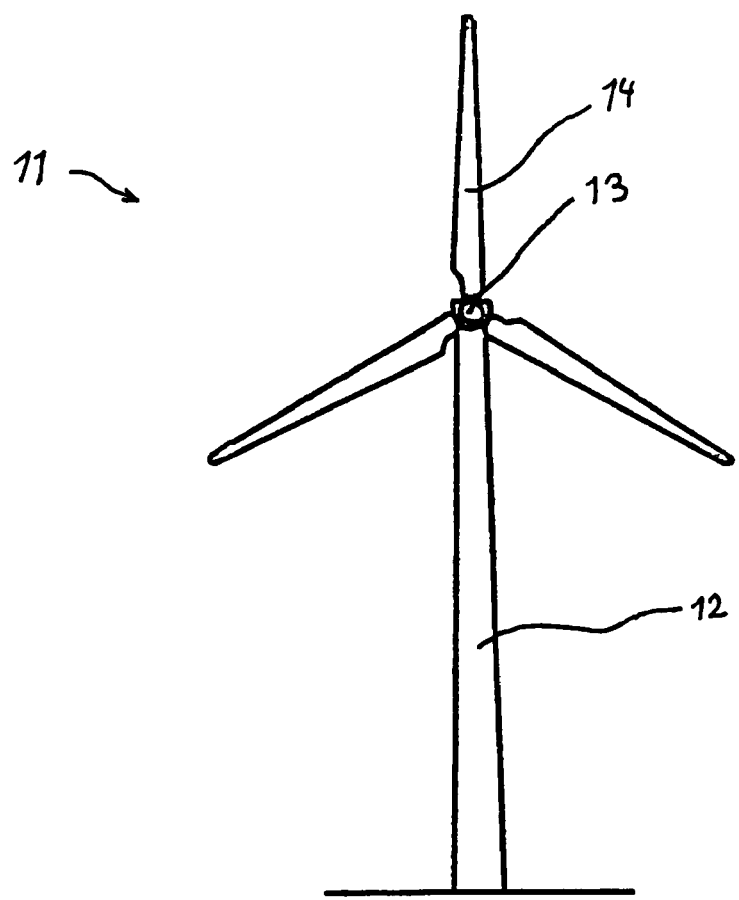
FIG. 1 shows a wind turbine with three blades.

FIG. 1 shows a modern wind turbine including a tower 12 with a hub 13 and three wind turbine blades 14 extending from the hub.

Figure 2:
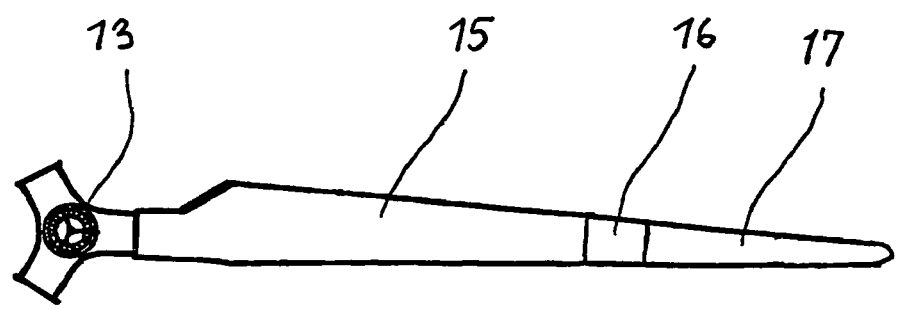
FIG. 2 shows a wind turbine blade.

FIG. 2 illustrates a wind turbine blade including a first zone 17 including the blade tip, said zone being reinforced substantially by carbon fibres. The blade further includes a second zone 15 being reinforced substantially by glass fibres. The first zone 17 extends into the second zone 15 via a transition zone 16 or transition area in which one type of fibres is gradually replaced by the other type of fibres.

Figure 3:
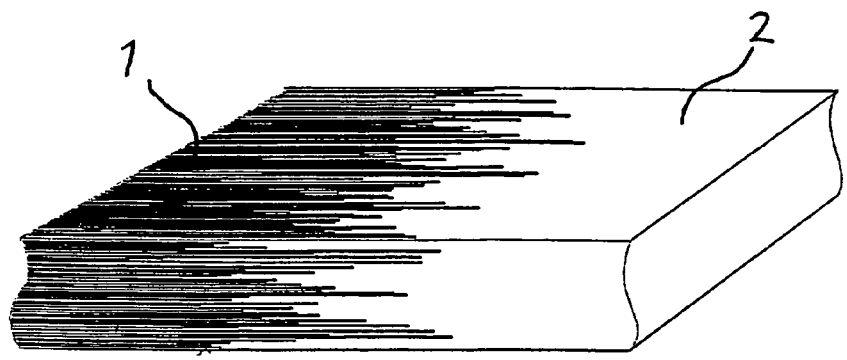
FIG. 3 shows a continuous variation of the quantitative ratio of two different fibre types according to a first embodiment of the invention.

The first embodiment of the invention shown in FIG. 3 is a sectional view of a wind turbine blade shell in a transition area in which the quantitative ratio of two types of fibres with different properties changes gradually. The first type of fibres 1, eg carbon fibres, extend from the left-hand side of the sectional view in form of bundles or single-fibres of different lengths. The other type of fibres 2, eg glass fibres, is not visible in FIG. 3, but are complementary to the carbon fibres. The transition between the two types of fibres is thus diffuse such that a smooth transition is obtained from the part of the blade, which is reinforced substantially by carbon fibres, to the part of the blade, which is reinforced substantially by glass fibres 2. As glass fibres tolerate a higher deflection than carbon fibres, a deflection of the blade causes a heavy concentration of stress in portions of the carbon fibres which border up to the boundary layer between the two types of fibres. This action is avoided in the embodiment shown in FIG. 3.

Figure 4:
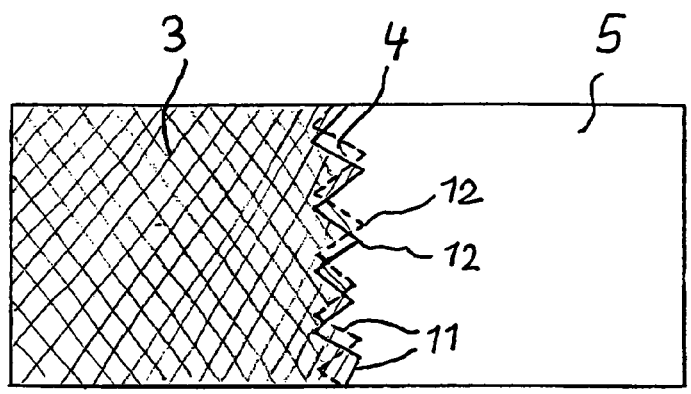
FIG. 4 shows a continuous variation of the quantitative ratio of two different fibre types according to a second embodiment of the invention.

FIG. 4 illustrates a second embodiment in which fibre mats of non-woven fibres or knitted fibre bundles have been punched, whereby they are provided with serrations in one of their ends. Two mats based on different types of fibres in the same fibre layer have similarly shaped serrations and thus mesh with each other. The serrations of two stacked fibre layers may be displaced in relation to each other, as shown in FIG. 4, whereby a smooth transition is obtained from the stiffness in the area shown on the left-hand side to the stiffness in the area shown on the right-hand side. FIG. 4 is a diagrammatic view of two stacked carbon fibre layers 3, 4. Two corresponding glass fibre layers are provided in the area 5. As also shown in FIG. 4 the tips 12 of the serrations 1 of the two carbon fibre layers 3, 4 are displaced in transverse direction to ensure a smooth stiffness transition. A transition zone between the area with carbon fibres and the area with glass fibres is thus determined by the length of the serrations. Accordingly the transition zone may vary according to need by either shortening or extending the length of the serrations.

Figure 5:
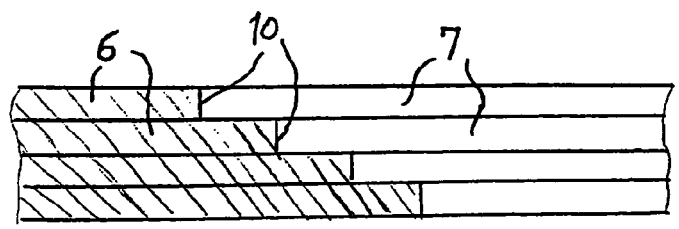
FIG. 5 shows a continuous variation of the quantitative ratio of two different fibre types according to a third embodiment of the invention.

FIG. 5 shows a particularly simple provision of the transition zone between a first zone and a second zone. FIG. 5 is a diagrammatic view of four stacked fibre layers, in which the fibre layers 6 are formed of for instance carbon fibres and the fibre layers 7 are formed of glass fibres. Each fibre layer has a boundary surface 10, where the carbon fibres are replaced by glass fibres, a transition zone of some length being obtained, since each boundary face 10 is displaced in relation to the other faces. The length of the transition zone may of course be varied according to need by displacing the boundary faces more or less in relation to each other and/or by using more fibre layers.

Figure 6:
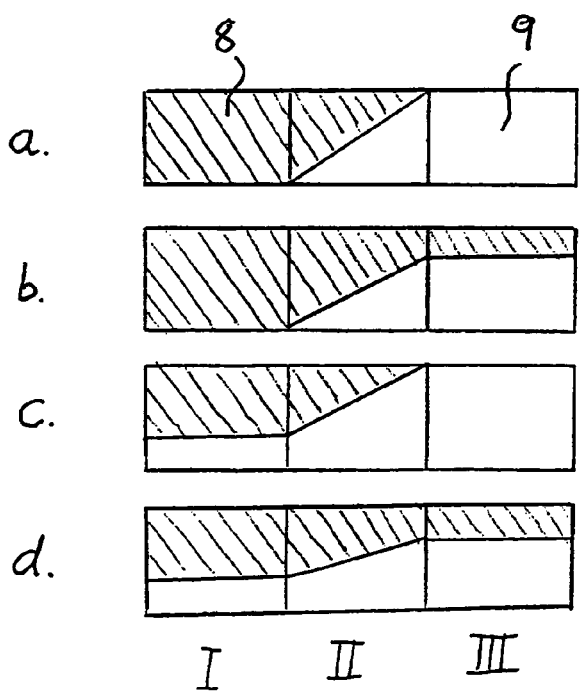
FIG. 6 shows diagrams illustrating how the quantitative ratio of two different fibre types may be varied in the longitudinal direction of the blade.

FIG. 6 is a diagrammatic view of the quantitative ratio of one type of fibres to the other type of fibres in the longitudinal direction of the blade. A first transition zone I and a second transition zone I both contain a constant quantitative ratio of the first type of fibres 8 to the second type of fibres 9. A transition zone II is provided between the two zones, the ratio of the second type of fibres 9 in said zone steadily increasing from the level in the first zone I to the level in the second zone III. FIG. 6a thus shows an embodiment, in which the first zone I is formed solely of fibres of the first type 8 and the second zone III is formed solely of fibres of the second type 9. FIG. 6b shows an embodiment, in which the first zone I is formed solely of fibres of the first type 8 and the second zone III includes a constant minority amount of the first type of fibres 9 and a constant majority amount of the second type of fibres 9. FIG. 6c shows an embodiment, in which the first zone I includes a constant majority amount of the first type of fibres 8 and a constant minority amount of the second type of fibres 9, and in which the second zone III is formed solely of the second type of fibres 9. FIG. 6d shows an embodiment, in which the first zone I includes a constant majority amount of the first type of fibres 9 and in which the second zone III includes a constant minority amount of the first type of fibres 8 and a constant majority amount of the second type of fibres 9.

FIG. 6a thus diagrammatically illustrates a preferred embodiment of a wind turbine blade, wherein the first zone I is the outer end portion of the blade including the blade tip and wherein the second zone III is the inner end portion of the blade including the blade root. The portion of the blade including the blade tip may thus be formed solely of carbon fibres and the portion of the blade including the blade root may be formed solely of glass fibres. Accordingly, a position between the two ends of the blade may be a transition zone II, in which the carbon fibres and the glass fibres gradually substitute each other. This transition zone II may have a restricted length of for instance 0.5-1 metre. The blade may, however, also be formed according to the quantitative ratios shown in FIGS. 6b-6d. The blade may also only include two zones, ie either the first zone I and the transition zone II or the transition zone II and the second zone III. Finally the blade may only include the transition zone II such that the amount of the one type of fibres for instance gradually increases in the entire length of the blade.

A transition zone may be provided in the blade during the fibre lay-up per se in the mould parts. It is, however, also possible to use prefabricated transitional laminates produced according to the principles shown in FIGS. 3, 4 and 5. Such prefabricated transitional laminates are advantageous for reasons of production in that the fibre lay-up process time is substantially the same as at the production of conventional wind turbine blades, in which the same material is used in the entire longitudinal direction of the blade.

Tests have shown that the outermost portions of the type of fibres having the highest stiffness in the transition zone may break at deflection of the transition zone, but this is not an entirely undesirable effect, as it contributes to a further smoothing of the stiffness transition. The frequency of broken fibres may thus be high but not critical, as they are surrounded by more compliant fibres. However, the broken fibres still contribute to reducing the deflection and thus the breakage of additional fibres. The gradual and even transition between the properties of the composite material based on the two different types of fibres is thus obtained by means of two factors. The first factor is the distribution of stiff and compliant fibres to obtain a smooth transition from the stiff to the compliant area. The second factor is the non-critical breakage which further smoothens the transition.

An additional not shown embodiment of a wind turbine blade according to the invention may be obtained by means of a so-called spray-up process. In this process a spray gun is used for the polymer material and a mixture of chopped fibres of the two types are ejected into a resin stream and sprayed into the mould. By varying the mix ratio during the spray-up process, the intended transition zone may be obtained.

The invention is not restricted to the above embodiments. In addition to glass and carbon fibres other fibre types may be used for the manufacture of a wind turbine blade according to the invention. Examples of possible fibres include hemp fibres or other cellulose fibres such as aramid fibres and other plastic fibres.

Accordingly a wind turbine blade is possible, in which the end provided with the blade root is primarily made of glass-fibre-reinforced polymer and wherein a central portion of the blade is made of carbon fibre-reinforced polymer, while the blade tip is made of aramid fibre-reinforced polymer, the density of aramid fibres being even less than that of carbon fibres. A transition zone may thus be provided between the glass-fibre-reinforced portion and the carbon fibre-reinforced portion and between the carbon fibre-reinforced portion and the aramid fibre-reinforced portion.

In addition to the blade shell per se, the strengthening beams and other internal strengthening members in the wind turbine blade may be made of polymers reinforced by different types of fibres, the quantitative ratio of one type to the other type varying continuously in the longitudinal direction of the blade.

The advantages according to the invention are obtained especially in connection with the load-bearing parts. The load-bearing parts include inter alia the main laminates in form of longitudinal fibre-reinforced polymer bands extending in the areas of the suction and pressure sides of the blade shell being furthest from the centre of the blade cross section. The laminates bracing the blade in edgewise direction at the leading and trailing edges of the blade may also advantageously have a continuously varying quantitative ratio of the two types of fibres.

For lightning reasons it may be advantageous to make the outermost portion of the blade tip entirely out of fibre glass so as to ensure that strokes of lightning hit a purpose-built lightning receptor and not the electrically conducting carbon fibre material.

The elongation at breakage for glass fibres is typically about 4.8%, while it typically ranges between 0.3% and 1.4% for carbon fibres. Young's Modulus of glass fibres is about 73,000 MPa, while the Modulus of carbon fibres (means modulus) typically is about 245,000 MPa. Carbon fibres are typically 3-4 times stiffer than glass fibres. The density of glass is about 2.54 $g/cm^3$, while the density of carbon is about 1.75 $g/cm^3$.

The invention claimed is:

1. Wind turbine blade of fibre-reinforced polymer including a first type of fibres (1,3, 6) of a first stiffness and a first elongation at breakage, and a second type of fibres (2, 5, 7) of a different stiffness and different elongation at breakage, characterised in that the two types of fibres are distributed in the polymer matrix and that in at least a portion of the blade when seen in a sectional view perpendicular to the longitudinal direction of the blade the quantitative ratio of the two types of fibres varies continuously in the longitudinal direction of the blade.

2. Wind turbine blade according to claim 1, wherein the first type of fibres is glass fibres (1) and the second type of fibres is carbon fibres (2).

3. Wind turbine blade according to claim 1, characterised in that the quantitative ratio increases or decreases continuously from a first level to a second level.

4. Wind turbine blade according to claim 1, characterised in that the quantitative ratio varies continuously in a transition zone of a length less than the length of the blade.

5. Wind turbine blade according to claim 4, characterised in that the transition zone is provided between a first zone (I) and a second zone (II), said zone both having a substantially uniform quantitative ratio between the two types of fibres.

6. Wind turbine blade according to claim 5, wherein the length of the transition zone (II) is between 0.5 and 1 metre.

7. Wind turbine blade according to claim 4, wherein the blade is divided into the transition zone (II) including the blade root and an additional zone including the rest of the blade.

8. Wind turbine blade according to claim 4, wherein the blade is divided into the transition zone (II) including the blade tip and an additional zone including the rest of the blade.

9. Wind turbine blade according to claim 4, characterised in that fibres or fibre bundles of the first type (1) with different lengths extend from a first end of the transition zone (II) and fibres or fibre bundles of the second type (2) extend from the opposite end of the transition zone.

10. Wind turbine blade according to claim 4, characterised in that the transition zone (II) is formed of a laminate of several fibre layers (6, 7), in which each fibre layer has a boundary surface (10) at a position in the longitudinal direction, the fibre layer including fibres of the first type (6)

on one side of the boundary surface and fibres of the second type (7) on the other side of the boundary face, the boundary surfaces (10) of each fibre layer being displaced in relation to the other layers in the longitudinal direction of the blade.

11. Wind turbine blade according to claim 10, wherein the boundary surfaces (11) are serrated when seen in a sectional view parallel to the fibre layers (3, 4, 5).

12. Wind turbine blade according to claim 11, wherein the tips (12) of the serrated boundary surfaces (11) are displaced in relation to each other in the transverse direction of the blade.

13. Wind turbine blade according to claim 1, characterised in that at least another portion of the blade when seen in said sectional view has a constant content of fibres of the first type (1, 3, 6) and/or of the second type (2, 5, 7).

14. Prefabricated transition shell blank for the manufacture of the shell of a wind turbine blade, said transition shell blank being made of fibre-reinforced polymer including a first type of fibres (1, 3, 6) of a first stiffness and a first elongation at breakage, and a second type of fibres (2, 5, 7) of a different stiffness and a second elongation at breakage, characterised in that the two types of fibres are distributed in the polymer matrix and that in at least a portion of the shell blank when seen in a sectional view perpendicular to the longitudinal direction of the shell blank the quantitative ratio varies continuously in the longitudinal direction of the transitional shell blank.

15. Prefabricated transitional shell blank according to claim 14, characterised in that at least another portion of the shell blank when seen in said sectional view has a constant content of fibres of the first type (1, 3, 6) and/or of the second type (2, 5, 7).

16. Wind turbine blade of fiber-reinforced polymer comprising:
an inner end portion including a blade root and made substantially from fiber glass-reinforced polymer and including glass fibers; and
an outer end portion including the blade tip and made substantially from carbon fiber-reinforced polymer and including carbon fibers,
wherein the outer end portion opposite the blade tip includes a transition zone in which the carbon fibers are gradually replaced by glass fibers thus forming a smooth and gradual transition from the glass fibers to the carbon fibers.

17. Wind turbine blade according to claim 16, wherein a length of the transition zone is between 0.5 and 1 metre.

18. Wind turbine blade according to claim 16, wherein the two types of fibers are distributed in the polymer matrix such that carbon fibers or carbon fiber bundles with varying lengths extend from a first end of the transition zone and glass fibers or glass fiber bundles extend from an opposite end of the transition zone.

19. Wind turbine blade according to claim 16, wherein the transition zone is formed of a laminate of several fiber layers, in which each fiber layer has a boundary surface at a position in the longitudinal direction, the fiber layer including carbon fibers on one side of the boundary surface and glass fibers on the other side of the boundary face, the boundary surfaces of each fiber layer being displaced in relation to each other in the longitudinal direction of the blade.

20. Wind turbine blade according to claim 19, wherein the boundary surfaces are serrated in a sectional view parallel to the fiber layers.

21. Wind turbine blade of fiber-reinforced polymer comprising;
an inner end portion including a blade root and made substantially from fiber glass-reinforced polymer; and
an outer end portion including a blade tip and made substantially from carbon fiber-reinforced polymer, wherein the outer end portion opposite the blade tip includes a transition zone in which the carbon fibers are gradually replaced by glass fibers, and wherein the transition zone is formed of a laminate of several fiber layers, in which each fiber layer has a boundary surface at a position in the longitudinal direction, the fiber layer including carbon fibers on one side of the boundary surface and glass fibers on the other side of the boundary face, the boundary surfaces of each fiber layer being displaced in relation to each other in the longitudinal direction of the blade, wherein the boundary surfaces are serrated in a sectional view parallel to the fiber layers and wherein the tips of the serrated boundary surfaces are displaced in relation to each other in the transverse direction of the blade.

22. A wind turbine blade comprising:
a blade root made substantially from fiber glass-reinforced polymer including glass fibers;
an outer end portion including a blade tip, the outer end portion made substantially from carbon fiber-reinforced polymer including carbon fibers; and
a transition zone at a position between the blade root and the outer end portion,
wherein in the transition zone, the glass fibers from the blade root are gradually replaced by the carbon fibers in the outer end portion, thus forming a smooth and gradual transition from the glass fibers to the carbon fibers.

23. A wind turbine blade as recited in claim 22, wherein the glass fibers comprise at least one of glass fibers and glass fiber bundles.

24. A wind turbine blade as recited in claim 22, wherein the carbon fibers comprise at least one of carbon fibers and carbon fiber bundles.

25. A wind turbine blade as recited in claim 22, wherein a length of the transition zone is between 0.5 and 1 meters.

26. A wind turbine blade as recited in claim 22, wherein the glass fibers comprise at least one of glass fibers and glass fiber bundles and the carbon fibers comprise at least one of carbon fibers and carbon fiber bundles.

27. A wind turbine blade as recited in claim 26, wherein the glass fibers and the carbon fibers are distributed in a polymer matrix such that the at least one of carbon fibers and carbon fiber bundles have varying lengths and extend from a first end of the transition zone and the at least one of glass fibers and glass fiber bundles have varying lengths and extend from an opposite end of the transition zone.

28. A wind turbine blade as recited in claim 22 wherein the transition zone is formed of a laminate of several fiber layers, in which each fiber layer has a boundary surface at a position in a longitudinal direction, the fiber layer including carbon fibers on one side of the boundary surface and glass fibers on the other side of the boundary surface, the boundary surfaces of each fiber layer being displaced in relation to each other in the longitudinal direction of the blade.

29. A wind turbine blade as recited in claim 28, wherein the boundary surfaces are serrated in a sectional view parallel to the fiber layers.

* * * * *